(12) United States Patent  
Bellegarda

(10) Patent No.: US 7,643,990 B1  
(45) Date of Patent: Jan. 5, 2010

(54) GLOBAL BOUNDARY-CENTRIC FEATURE EXTRACTION AND ASSOCIATED DISCONTINUITY METRICS

(75) Inventor: Jerome R. Bellegarda, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 842 days.

(21) Appl. No.: 10/693,227

(22) Filed: Oct. 23, 2003

(51) Int. Cl.
*G10L 19/14* (2006.01)
*G10L 11/06* (2006.01)
*G10L 21/00* (2006.01)
*G10L 15/00* (2006.01)
*G10L 13/08* (2006.01)

(52) U.S. Cl. ............... 704/211; 704/214; 704/216; 704/245; 704/258; 704/260

(58) Field of Classification Search .......... 704/211, 704/216, 245
See application file for complete search history.

(56) References Cited

U.S. PATENT DOCUMENTS

| 3,828,132 | A | | 8/1974 | Flanagan et al. |
| 4,813,074 | A | * | 3/1989 | Marcus ................... 704/254 |
| 5,537,647 | A | * | 7/1996 | Hermansky et al. ......... 704/211 |
| 5,581,652 | A | * | 12/1996 | Abe et al. .................. 704/222 |
| 5,745,873 | A | * | 4/1998 | Braida et al. ............... 704/222 |
| 5,933,806 | A | * | 8/1999 | Beyerlein et al. ......... 704/256.8 |
| 6,275,795 | B1 | * | 8/2001 | Tzirkel-Hancock ......... 704/214 |
| 6,665,641 | B1 | * | 12/2003 | Coorman et al. ............ 704/260 |
| 2002/0035469 | A1 | * | 3/2002 | Holzapfel .................. 704/211 |

OTHER PUBLICATIONS

Michael Banbrook, 'Nonlinear Analysis of Speech From a Synthesis Perspective', A thesis submitted for the degree of Doctor of Philosophy at The University of Edinburgh; Oct. 15, 1996, (Specifically Chapter 4).*
Ansari et al., 'Pitch Modification of Speech Using a Low-Sensitivity Inverse Filter Approach'; IEEE Signal Processing Letters; Mar. 1998.*
Klabbers, Esther, et al., "Reducing Audible Spectral Discontinuities," IEEE Transactions on Speech and Audio Processing, vol. 9 No. 1, Jan. 2001, pp. 39-51.
Bellegarda, Jerome R., "Exploiting Latent Semantic Information in Statistical Language Modeling," Proceedings of the IEEE, Aug. 2000, pp. 1-18.
Wu, Min, "Digital Speech Processing and Coding," Electrical & Computer Engineering, University of Maryland, College Park, Feb. 4, 2003, pp. 1-11.
Bellegarda, Jerome R., "Data-Driven Global Boundary Optimization," United States Patent Application, filed Oct. 23, 2003.

* cited by examiner

*Primary Examiner*—David R Hudspeth
*Assistant Examiner*—Justin W Rider
(74) *Attorney, Agent, or Firm*—Blakely, Sokoloff, Taylor & Zafman LLP

(57) ABSTRACT

Portions from time-domain speech segments are extracted. Feature vectors that represent the portions in a vector space are created. The feature vectors incorporate phase information of the portions. A distance between the feature vectors in the vector space is determined. In one aspect, the feature vectors are created by constructing a matrix W from the portions and decomposing the matrix W. In one aspect, decomposing the matrix W comprises extracting global boundary-centric features from the portions. In one aspect, the portions include at least one pitch period. In another aspect, the portions include centered pitch periods.

100 Claims, 11 Drawing Sheets

GLOBAL BOUNDARY-CENTRIC FEATURE EXTRACTION AND ASSOCIATED DISCONTINUITY METRICS

TECHNICAL FIELD

This disclosure relates generally to text-to-speech synthesis, and in particular relates to concatenative speech synthesis.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Apple Computer, Inc., All Rights Reserved.

BACKGROUND OF THE INVENTION

In concatenative text-to-speech synthesis, the speech waveform corresponding to a given sequence of phonemes is generated by concatenating pre-recorded segments of speech. These segments are extracted from carefully selected sentences uttered by a professional speaker, and stored in a database known as a voice table. Each such segment is typically referred to as a unit. A unit may be a phoneme, a diphone (the span between the middle of a phoneme and the middle of another), or a sequence thereof. A phoneme is a phonetic unit in a language that corresponds to a set of similar speech realizations (like the velar \k\ of cool and the palatal \k\ of keel) perceived to be a single distinctive sound in the language. In diphone synthesis, the voice table contains exactly one exemplar of each possible diphone. This "canonical" exemplar is usually hand-picked from a suitable inventory by a trained acoustician, in order to maximize the perceived quality of the associated phoneme-to-phoneme transition. Although this solution is expedient in terms of data collection cost and memory footprint, it does, however, inherently limit the quality of the resulting synthetic speech, because no set of canonical diphones can possibly perform acceptably in all conceivable situations.

To make synthetic speech sound more natural, it is highly desirable to process longer speech segments, so as to reduce the number of discontinuities at segment boundaries. This is referred to as polyphone synthesis. In this approach, the voice table includes several exemplars of each diphone, each extracted from a different phrase. The voice table may also contain contiguity information to recover longer speech segments from which the diphones are extracted. At synthesis time, it is therefore necessary to select the most appropriate segment at a given point, a procedure known as unit selection. Unit selection is typically performed on the basis of two criteria: unit cost, and concatenation cost. Unit cost is related to the intrinsic properties of the unit, such as pitch and duration behavior, which tend to be relatively easy to quantify. Concatenation cost attempts to quantify the amount of perceived discontinuity with respect to the previous segment, and has proven considerably more difficult to quantify.

The concatenation cost between two segments $S_1$ and $S_2$ is typically computed via a metric $d(S_1, S_2)$ defined on some appropriate features extracted from $S_1$ $S_2$. Briefly, given two feature vectors (one associated with $S_1$ and one with $S_2$), some expression of the "difference" between the two is used as an estimate of the perceived discontinuity at the boundary between $S_1$ and $S_2$. Not surprisingly, the choice of features heavily influences the accuracy of this estimate. Conventional feature extraction involves such various features as Fast Fourier Transform (FFT) amplitude spectrum, perceptual spectrum, Linear Predictive Coding (LPC) coefficients, mel-frequency cepstral coefficients (MFCC), formant frequencies, or line spectral frequencies. All of these features are spectral in nature, meaning that they represent different ways to encapsulate the frequency content of the signal. This is motivated by a history of speech research underscoring the importance of spectral features to speech perception. Phase information, on the other hand, is typically ignored.

SUMMARY OF THE DESCRIPTION

Methods and apparatuses for feature extraction and discontinuity metrics are described herein. The following provides as summary of some, but not all, embodiments described within this disclosure; it will be appreciated that certain embodiments which are claimed will not be summarized here. In one exemplary embodiment, a feature extraction method operates directly in the time domain to preserve phase information, and is boundary-centric to capture global phenomena. For each phoneme, a pitch synchronous singular value analysis of the pitch periods recorded in the vicinity of the relevant boundary is performed.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
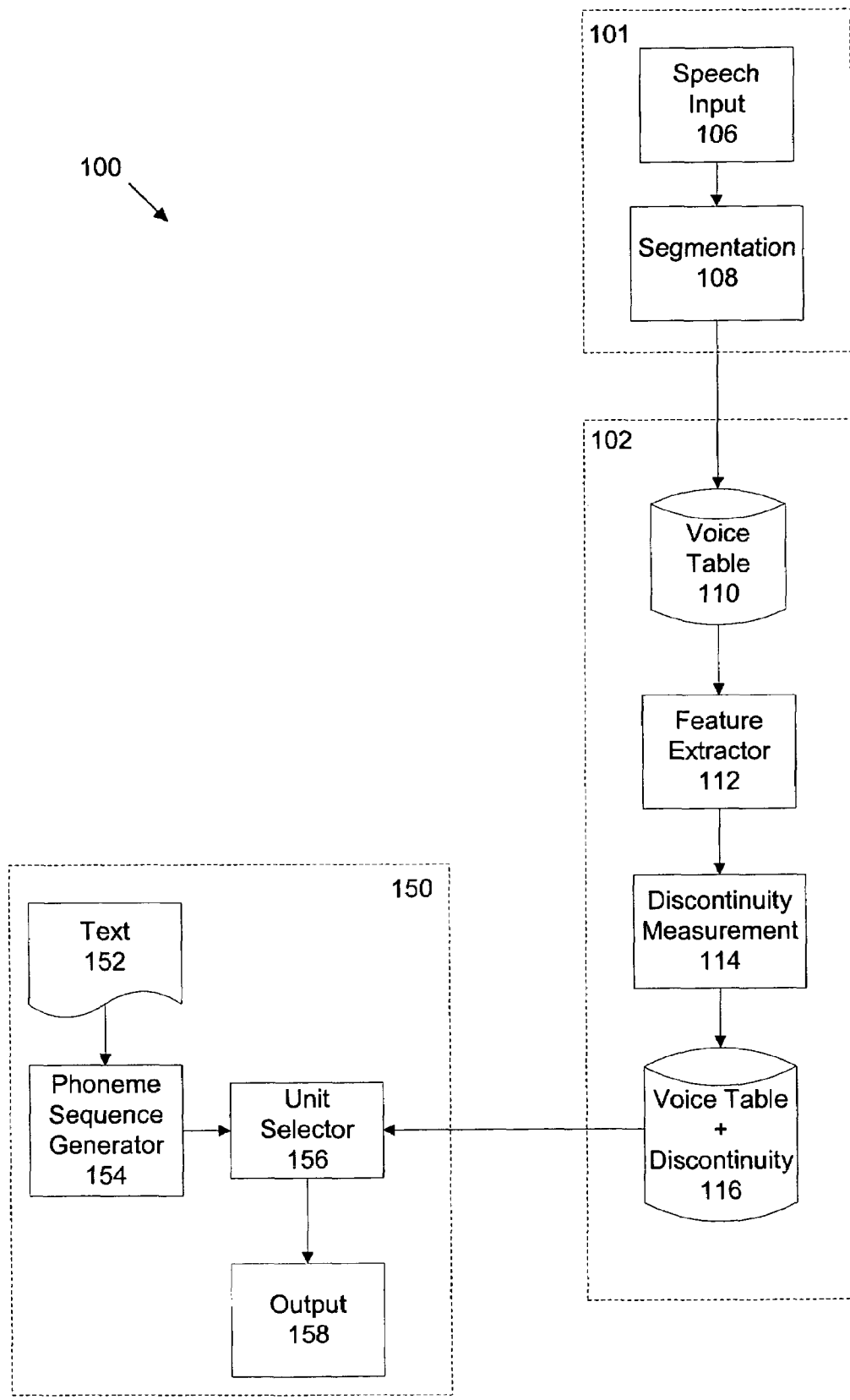
FIG. 1 illustrates a system level overview of an embodiment of a text-to-speech (TTS) system.

FIG. 1 illustrates a system level overview of an embodiment of a text-to-speech (TTS) system 100 which produces a speech waveform 158 from text 152. TTS system 100 includes three components: a segmentation component 101, a voice table component 102 and a run-time component 150. Segmentation component 101 divides recorded speech input 106 into segments for storage in a voice table 110. Voice table component 102 handles the formation of a voice table 116 with discontinuity information. Run-time component 150 handles the unit selection process during text-to-speech synthesis.

Recorded speech from a professional speaker is input at block 106. In one embodiment, the speech may be a user's own recorded voice, which may be merged with an existing database (after suitable processing) to achieve a desired level of coverage. The recorded speech is segmented into units at segmentation block 108.

Segmentation, i.e. how the segments are cut after recording, defines unit boundaries, and may be accomplished in several ways. The defined unit boundaries influence the degree of discontinuity after concatenation, and therefore how natural the synthetic speech will sound. In one embodiment, a boundary optimization process adjusts individual unit boundaries one at a time, using a discontinuity metric. The result is an inventory of units whose boundaries are globally optimal. Further details may be found in co-filed U.S. patent application Ser. No. 10/692,994, entitled "Data-Driven Global Boundary Optimization," filed Oct. 23, 2003, assigned to Apple Computer, Inc., the assignee of the present invention, and which is herein incorporated by reference.

Contiguity information is preserved in the voice table 110 so that longer speech segments may be recovered. For example, where a speech segment $S_1$-$R_1$ is divided into two segments, $S_1$ and $R_1$, information is preserved indicating that the segments are contiguous; i.e. there is no artificial concatenation between the segments.

In one embodiment, a voice table 110 is generated from the segments produced by segmentation block 108. In another embodiment, voice table 110 is a pre-generated voice table that is provided to the system 100. Feature extractor 112 mines voice table 110 and extracts features from segments so that they may be characterized and compared to one another.

Once appropriate features have been extracted from the segments stored in voice table 110, discontinuity measurement block 114 computes a discontinuity between segments. In one embodiment, discontinuities are determined on a phoneme-by-phoneme basis; i.e. only discontinuities between segments having a boundary within the same phoneme are computed. The discontinuity between segments is determined by a metric. Embodiments of the present invention provide a suitable metric to measure the degree of discontinuity between segments. The discontinuity measurements for each segment are added as values to the voice table 110 to form a voice table 116 with discontinuity information. In one embodiment, discontinuities are determined for each phoneme.

Run-time component 150 handles the unit selection process. Text 152 is processed by the phoneme sequence generator 154 to convert text to phoneme sequences. Text 152 may originate from any of several sources, such as a text document, a web page, an input device such as a keyboard, or through an optical character recognition (OCR) device. Phoneme sequence generator 154 converts the text 152 into a string of phonemes. It will be appreciated that in other embodiments, phoneme sequence generator 154 may produce strings based on other suitable divisions, such as diphones. Unit selector 156 selects speech segments from the voice table 116 to represent the phoneme string. In one embodiment, the unit selector 156 selects segments based on discontinuity information stored in voice table 116. Once appropriate segments have been selected, the segments are concatenated to form a speech waveform for playback by output block 158.

In one embodiment, segmentation component 101 and voice table component 102 are implemented on a server computer, and the run-time component 150 is implemented on a client computer.

It will be appreciated that although embodiments of the present invention are described primarily with respect to phonemes and diphones, other suitable divisions of speech may be used. For example, in one embodiment, instead of using divisions of speech based on phonemes (linguistic units), divisions based on phones (acoustic units) may be used.

Figure 2:
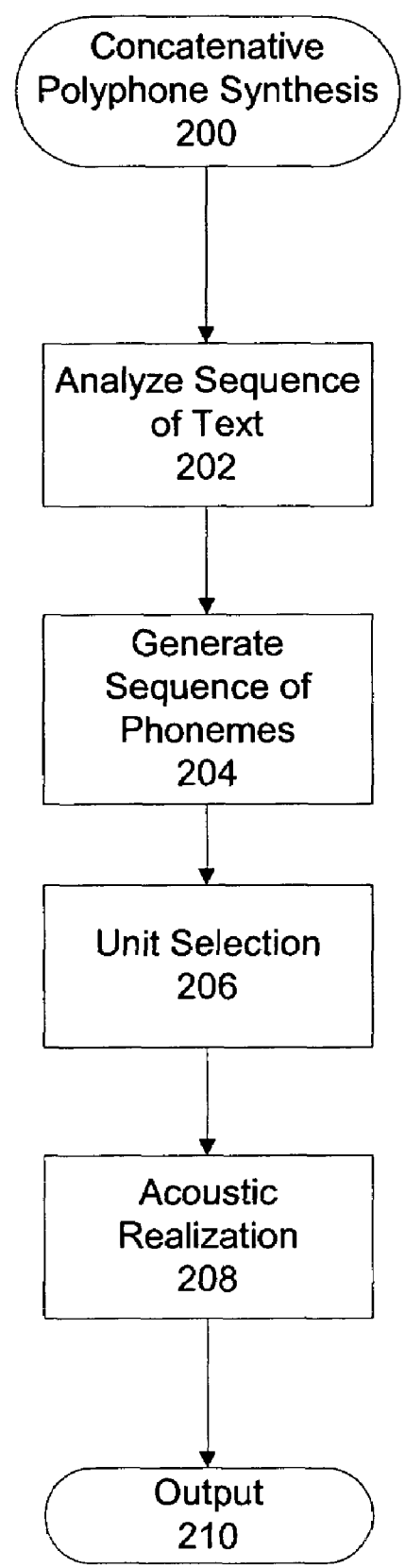
FIG. 2 illustrates a flow chart of an embodiment of a concatenative polyphone synthesis method.

FIG. 2 illustrates a flow chart of an embodiment of a concatenative polyphone synthesis method 200, which may be performed in system 100 of FIG. 1. A sequence of text is analyzed at block 202. As discussed above, the text may be in the form of a text document or derived from other sources. The text is analyzed at block 202 to preprocess the text in preparation for text-to-phoneme conversion. For example, in one embodiment, abbreviations are expanded, and numbers are converted to their textual equivalents (e.g. "1000" is converted to "one thousand"). Phrase structure is also assigned at block 202. A sequence of phonemes is generated from the preprocessed text at block 204 in a process also known as phonetization, according to a set of pronouncing or letter-to-sound rules. In one embodiment, phonetization is performed using a standard phonetic notation known as AppleBet from Apple Computer, Inc., the assignee of the present invention. In one embodiment, the resulting sequence of phonemes is used to pronounce the text.

Once a sequence of phonemes has been generated at block 204, a unit selection process 206 is performed to select speech segments (units) from a voice table. Unit selection is described in below with respect to FIG. 3. The phonemic expansion of the text is used to select segments from which a desired waveform is generated. Once speech segments have been selected, an acoustic realization process 208 is performed to generate a speech signal output at block 210.

Figure 3:
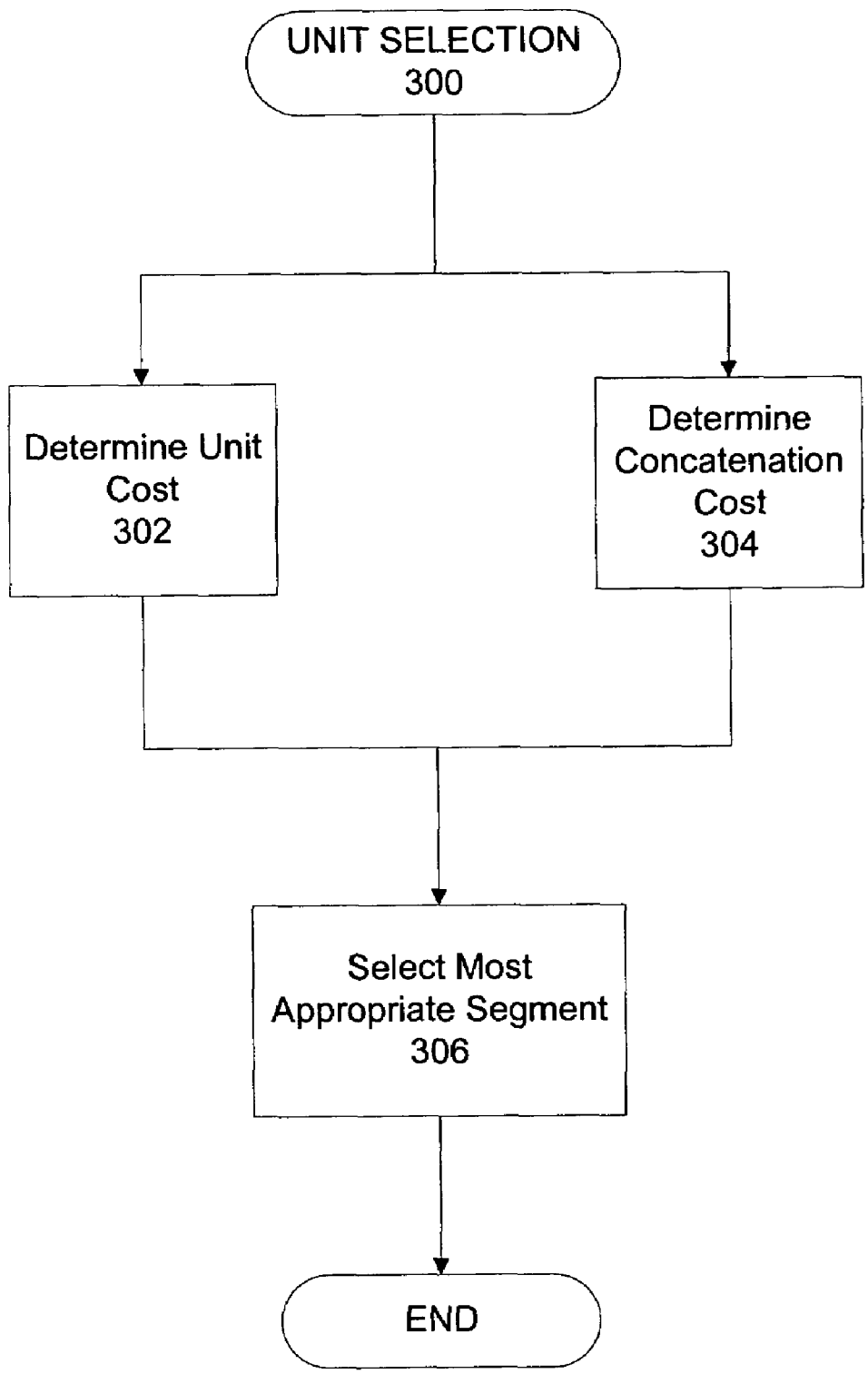
FIG. 3 illustrates a flow chart of an embodiment of a unit selection method.

FIG. 3 illustrates an embodiment of a unit selection method 300, which may be performed by block 206 of FIG. 2. As described above, unit selection includes two criteria: unit cost 302, and concatenation cost 304. Determining the unit cost 302 relates to intrinsic properties of the unit (such as pitch and duration behavior), which tend to be relatively easy to quantify. Unit cost is a combination of pitch cost and duration cost; each of which is the difference between the value measured on the unit in question and the ideal value that the unit should have given the context of the sentence. For example, in one embodiment, the ideal duration value is determined from a statistical duration model to be 30 ms for a particular context. Assuming that two units are available, one with a duration of 25 ms and the other with a duration of 45 ms; then the duration cost for the two units may be 5 and 15, respectively. In one embodiment, the duration cost for a unit may be a function of the difference between the duration value and the ideal value.

Determining concatenation cost 304 quantifies the amount of perceived discontinuity with respect to the previous segment. In one embodiment, unit cost 302 is determined simultaneously with concatenation cost. After considering both unit cost 302 and concatenation cost 304, the most appropriate segment is selected from the voice table 306.

Figure 4:
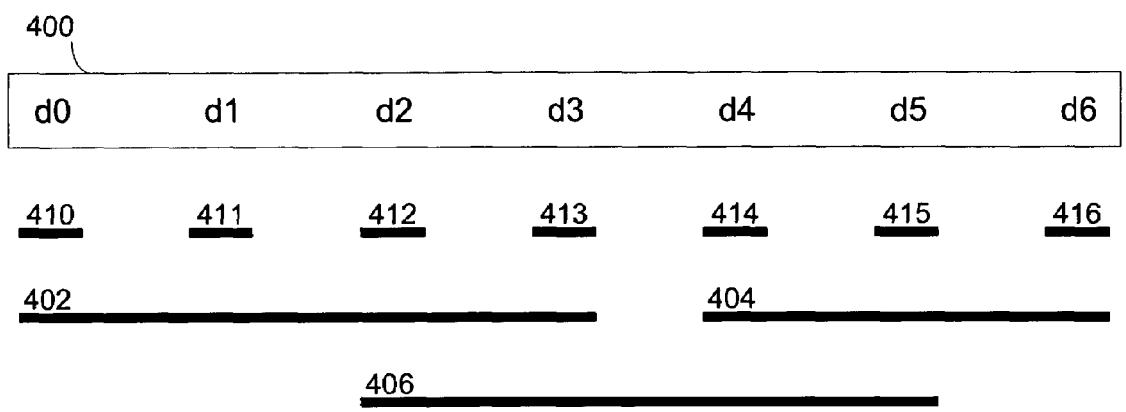
FIG. 4 illustrates an example of a sequence of diphones.

FIG. 4 illustrates an example of a sequence of diphones 400 generated from the phonetization of text that is to be synthesized into speech. In one embodiment, sequence 400 is produced by block 204 of FIG. 2. For illustrative purposes, in one embodiment, a voice table includes individual segments of speech 410, 411, 412, 413, 414, 415 and 416, each corresponding to one of diphones d0, d1, d2, d3, d4, d5 and d6, respectively. The voice table also includes a segment 402 corresponding to the diphone sequence d0-d1-d2-d3, a segment 404 corresponding to the diphone sequence d4-d5-d6, and a segment 406 corresponding to the diphone sequence d2-d3-d4-d5. To form the desired waveform representing sequence 400, there are several possible combinations of segments from the voice table, each combination having a specific concatenation cost determined in part by the discontinuity between segments. For example, to form the desired waveform for the diphone sequence 400, the following segment concatenations may be considered:

Segments 410+411+412+413+414+415+416 (1)

Segments 402+404 (2)

Segments 410+411+406+416 (3)

Segments 410+411+412+413+404 (4)

Segments 402+414+415+416 (5)

In the above combinations, a '+' symbol indicates a concatenation. A concatenation is where two segments are linked together to form a longer speech segment. A concatenation typically results in a discontinuity, except where the segments were originally contiguous. Audible concatenation artifacts may include clicks, pops, and other distortions. To select the most appropriate concatenation, a determination needs to be made as to which concatenation will sound the best; i.e. which concatenation will have the lowest perceived discontinuity. However, each discontinuity has differing perceptibility; therefore, the concatenation choice is not simply a matter of which concatenation has the lowest number of discontinuities, but rather the salience (i.e. prominence) of the discontinuities as a whole. The discontinuities for a particular concatenation may be combined using a variety of techniques. In one embodiment, a phoneme-weighted version of the concatenation cost is used, where the weights reflect the a priori suitability (all other things being equal) of cutting the sentence in that phoneme. For example, it is linguistically well-known that it is better to cut in the middle of a voiceless fricative (like "f" or "s") than in the middle of a liquid (like "l" or "r").

Figure 5:
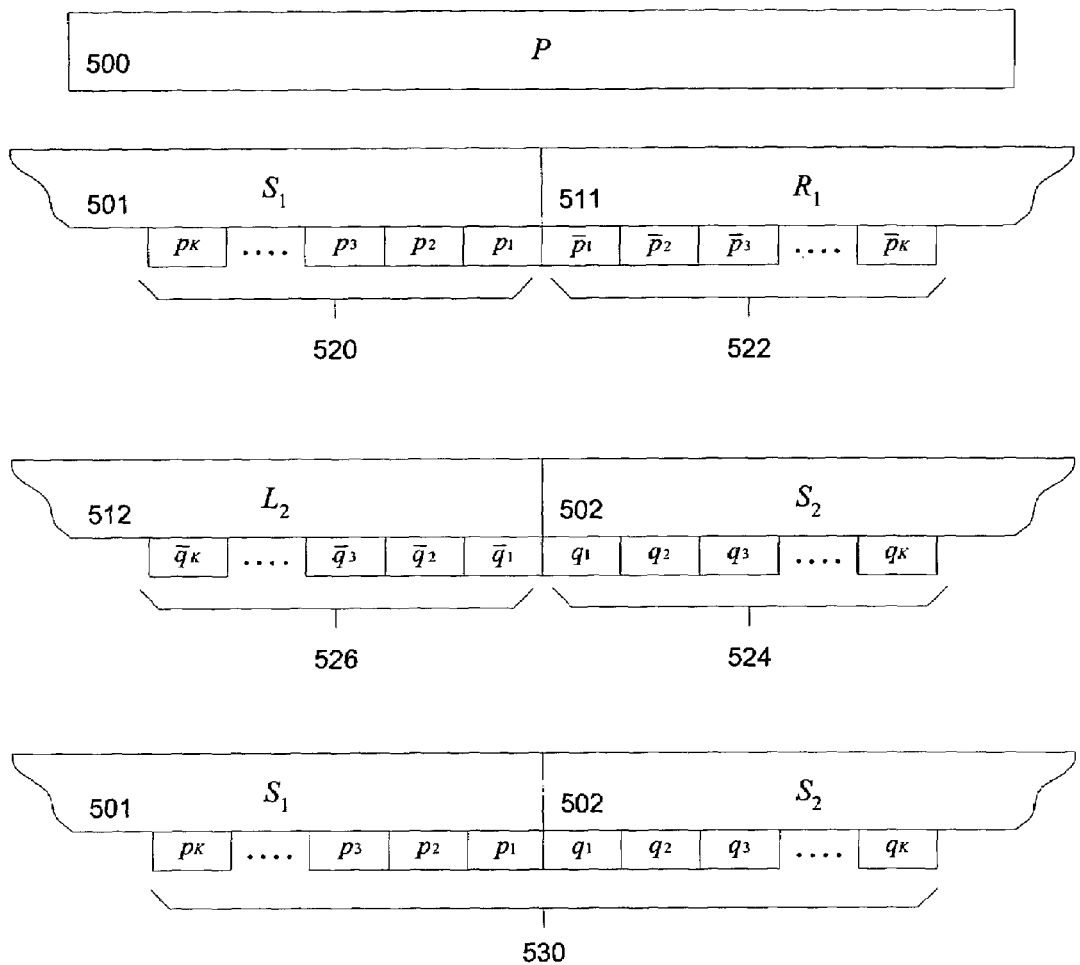
FIG. 5 illustrates an example of speech segments having a boundary in the middle of a phoneme.

In one embodiment, to measure discontinuity between segments, segments having a boundary in the middle of a phoneme are identified within a voice table. FIG. 5 illustrates an example of speech segments having a boundary in the middle of a phoneme, such as those that may be present in voice table 110 of FIG. 1. For illustrative purposes, a concatenation in the middle of the phoneme P 500 is considered. Four speech segments, $S_1$, $R_1$, $L_2$ and $S_2$, are considered. Assume that the voice table contains the contiguous segments $S_1$-$R_1$ and $L_2$-$S_2$, but not $S_1$-$S_2$. A speech segment $S_1$ 501 ends with the left half of P 500, and a speech segment $S_2$ 502 starts with the right half of P 500. Further denote by $R_1$ 511 and $L_2$ 512 the segments contiguous to $S_1$ 501 on the right and to $S_2$ 502 on the left, respectively (i.e., $R_1$ 511 comprises the second half of the P 500 in $S_1$ 501, and $L_2$ 512 comprises the first half of the P 500 in $S_2$ 502).

A pitch period is the period of vocal cord vibration that occurs during the production of voiced speech. In one embodiment, for voiced speech segments, each pitch period is obtained through conventional pitch epoch detection, and for voiceless segments, the time-domain signal is similarly chopped into analogous, albeit constant-length, portions.

Referring again to FIG. 5, let $p_K \ldots p_1$ 520 denote the last K pitch periods of $S_1$ 501, and $\bar{p}_1 \ldots \bar{p}_K$ 522 denote the first K pitch periods of $R_1$ 511, so that the boundary between $S_1$ 501 and $R_1$ 511 falls in the middle of the span $p_K \ldots p_1 \bar{p}_1 \ldots \bar{p}_K$. Similarly, let $q_1 \ldots q_K$ 524 be the first K pitch periods of $S_2$ 502, and $\bar{q}_K \ldots \bar{q}_1$ 526 be the last K pitch periods of $L_2$ 512, so that the boundary between $L_2$ 512 and $S_2$ 502 falls in the middle of the span $\bar{q}_K \ldots \bar{q}_1 q_1 \ldots q_K$. As a result, the boundary region 530 between $S_1$ and $S_2$ can be represented by $p_K \ldots p_1 q_1 \ldots q_K$.

It will be appreciated that in other embodiments, divisions of the segments other than pitch periods may be employed. For example, in an alternate embodiment, centered pitch periods may be used, as described in more detail below with respect to FIG. 9.

Figure 6:
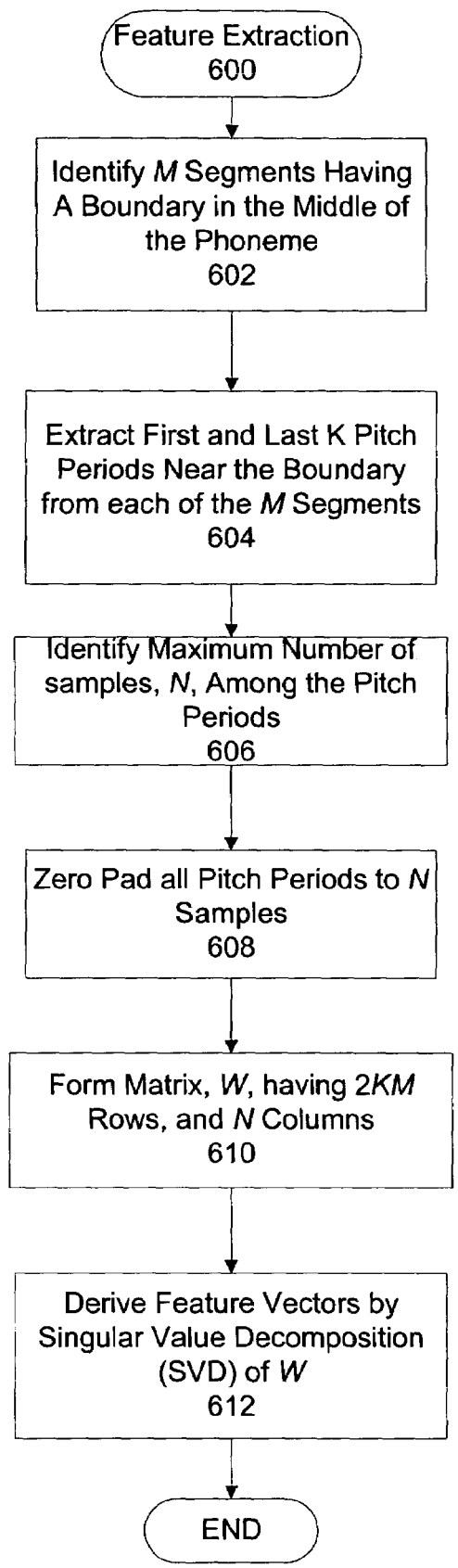
FIG. 6 illustrates a flow chart of an embodiment of a feature extraction method.

FIG. 6 illustrates a flow chart of an embodiment of a feature extraction method 600 for segments having a boundary in the middle of a phoneme P. Feature extraction method 600 may be performed by feature extractor 112 of FIG. 1. For clarity, the segments $S_1$-$R_1$ and $L_2$-$S_2$, discussed above with respect to FIG. 5, are referred to with respect to FIG. 6. As discussed above, feature extraction is the process of extracting features from speech segments so that they may be characterized and compared to one another. In one embodiment, the feature extraction process is carried out on a phoneme-by-phoneme basis and is performed directly on time-domain speech samples.

At block 602, M segments like $S_1$-$R_1$ and $L_2$-$S_2$ present in the voice table are identified, i.e., segments having a boundary in the middle of the phoneme P. At block 604, using conventional pitch epoch detection, the relevant first and last K pitch periods near the boundary are extracted for each of the M segments. This results in 2KM pitch periods in total, comprising time-domain samples specifically related to what is occurring in the vicinity of the segment boundary. In one embodiment, K=3, meaning that three pitch periods before the boundary and three pitch periods after the boundary are gathered. At block 606, the maximum number of time samples, N, observed among the extracted pitch periods, is identified. At block 608, the extracted pitch periods are padded with zeros, such that each pitch period has N samples. In one embodiment, the pitch periods are padded on the right side. In another embodiment, the pitch periods are padded on each side symmetrically. In one embodiment, M and N are on the order of a few hundreds.

Figure 7:
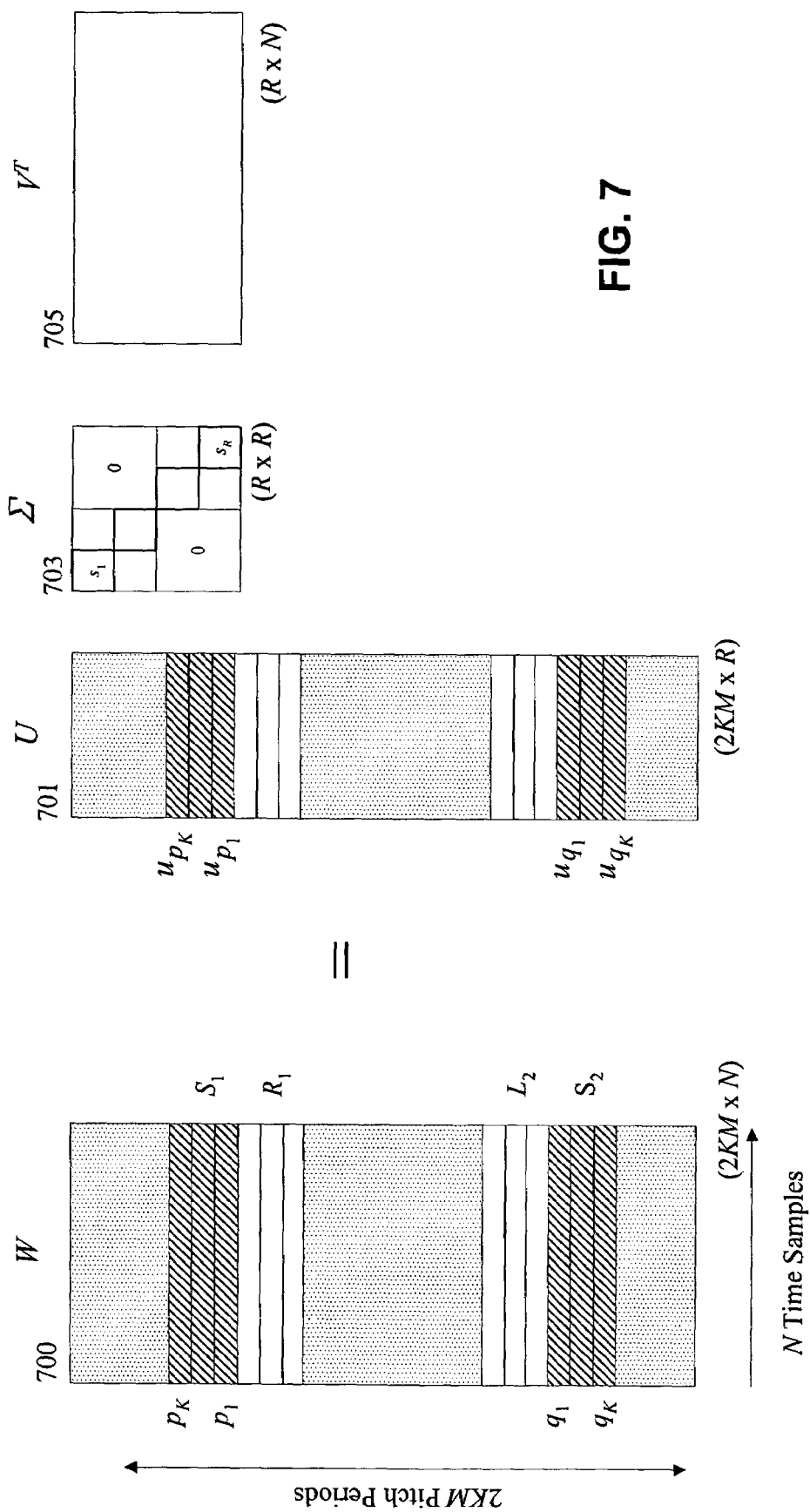
FIG. 7 illustrates an embodiment of the decomposition of an input matrix.

At block 610, the time-domain samples corresponding to the K pitch periods surrounding the boundary for all exemplars comprising the current phoneme, P, are gathered into a 2KM×N matrix, W, as illustrated in FIG. 7 and described in greater detail below. Matrix W has 2KM rows, each row corresponding to a particular pitch period surrounding the boundary of the current phoneme, P. Matrix W has N columns, each column corresponding to time samples within each pitch period.

At block 612, feature vectors are derived from the matrix W. In one embodiment, the feature vectors are derived by performing a matrix-style modal analysis through a singular value decomposition (SVD) of the matrix W, as:

$$W = U\Sigma V^T \quad (6)$$

where U is the (2KM×R) left singular matrix with row vectors $u_i$ (1≦i≦2KM), $\Sigma$ is the (R×R) diagonal matrix of singular values $s_1 \geq s_2 \geq \ldots \geq s_R > 0$, V is the (N×R) right singular matrix with row vectors $v_j$ (1≦j≦N), R<<2KM, N is the order of the decomposition, and T denotes matrix transposition. The vector space of dimension R spanned by the $u_i$'s and $v_j$'s is referred to as the SVD space. In one embodiment, R=5.

FIG. 7 illustrates an embodiment of the decomposition of the matrix W 700 into U 701, $\Sigma$ 703 and $V^T$ 705. This (rank-R) decomposition defines a mapping between the set of pitch periods and, after appropriate scaling by the singular values of $\Sigma$, the set of R-dimensional vectors $\bar{u}_i = u_i \Sigma$. The latter are the feature vectors resulting from the extraction mechanism.

Thus, in one embodiment, a pitch synchronous singular value analysis is performed directly on the time-domain samples. Two observations motivate this approach. First, since it is only at the boundaries that the amount of discontinuity will be measured, all the relevant information is likely to be contained within a few pitch periods surrounding each boundary, hence the attractiveness of pitch synchronous processing. Second, when determining which segment is optimal at any given boundary point, all exemplars comprising the current phoneme are likely to be germane to the decision, hence the attractiveness of a global optimization framework such as that offered by singular value analysis.

Since time-domain samples are used, both amplitude and phase information are retained, and in fact contribute simultaneously to the outcome. In contrast to conventional approaches, this mechanism takes a global view of what is happening in the boundary region for the phoneme P, as reflected in the SVD vector space spanned by the resulting set of left and right singular vectors. In fact, each row of the matrix (i.e. pitch period) is associated with a vector in that space. These vectors can be viewed as feature vectors, and thus directly lead to new metrics $d(S_1, S_2)$ defined on the SVD vector space. The relative positions of the feature vectors are determined by the overall pattern of the time-domain samples observed in the relevant pitch periods, as opposed to a (frequency domain or otherwise) processing specific to a particular instance. Hence, two vectors $\bar{u}_k$ and $\bar{u}_l$, which are "close" (in a suitable metric) to one another can be expected to reflect a high degree of time-domain similarity, and thus potentially a small amount of perceived discontinuity.

Figure 8:
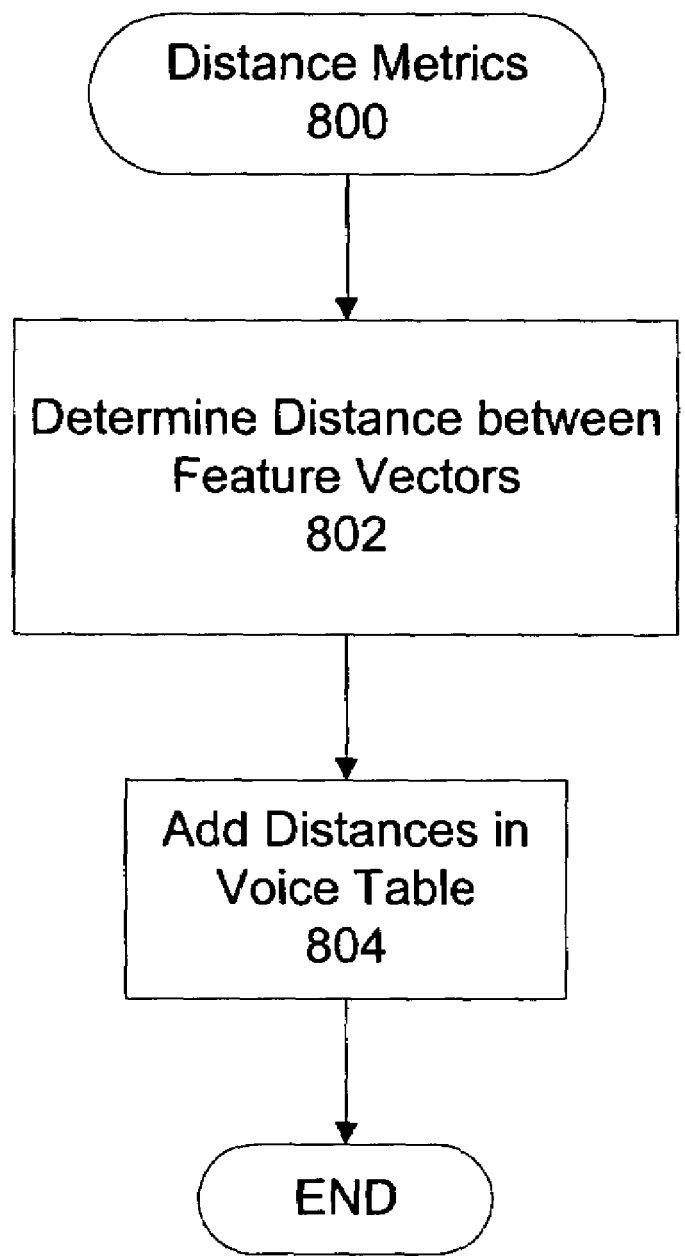
FIG. 8 illustrates a flow chart of an embodiment of a distance metrics method.

FIG. 8 illustrates an embodiment of a distance metrics method 800 which may be performed on the feature vectors derived at block 612 of FIG. 6. At block 802, once appropriate feature vectors are extracted from matrix W, as described above, a distance or metric is determined between vectors as a measure of perceived discontinuity between segments. In one embodiment, distances are determined on a phoneme-by-phoneme basis between all segments having a boundary in the middle of the phoneme.

Various metrics may be used to compare the feature vectors. In one embodiment, a suitable metric exhibits a high correlation between $d(S_1, S_2)$ and perception. In one embodiment, a value $d(S_1, S_2) = 0$ should highly correlate with zero discontinuity, and a large value of $d(S_1, S_2)$ should highly correlate with a large perceived discontinuity.

In one embodiment, the cosine of the angle between the two vectors is determined to compare $\bar{u}_k$ and $\bar{u}_l$ in the SVD space. This results in the closeness measure:

$$C(\bar{u}_k, \bar{u}_l) = \cos(u_k \Sigma, u_l \Sigma) = \frac{u_k \Sigma^2 u_l^T}{\|u_k \Sigma\| \|u_l \Sigma\|} \quad (7)$$

for any 1≦k, l≦2KM. This measure in turn leads to a variety of distance metrics in the SVD space. In one embodiment, the simplest expression for the distance between $S_1$ and $S_2$ is:

$$d(S_1, S_2) = d_0(p_1, q_1) = 1 - C(\bar{u}_{p1}, \bar{u}_{q1}) \quad (8)$$

where $\bar{u}_{p1}$ and $\bar{u}_{q1}$ are the feature vectors in the SVD space which are associated with the pitch periods $p_1$ and $q_1$. The result of (8) is referred to as the "raw" SVD distance. It will be appreciated that this expression (8) can be trivially generalized in various ways to encompass more than one pitch period on either side, as necessary. For example, in one embodiment, to take into account two pitch periods on either side, the following expression may be used:

$$d(S_1, S_2) = d_0(p_1, q_1) + d_0(p_1, q_2) + d_0(p_2, q_1) + d_0(p_2, q_2) \quad (8.1)$$

In one embodiment, it is also possible to "calibrate" this measure (8) by taking into account what happens at the boundary when no concatenation occurs. This leads to the alternative distance:

$$d(S_1, S_2) = \left| d_0(p_1, q_1) \frac{-d_0(p_1, \bar{p}_1) + d_0(q_1, \bar{q}_1)}{2} \right| = \left| \frac{C(\bar{u}_{p1}, \bar{u}_{p1}) + C(\bar{u}_{q1}, \bar{u}_{q1})}{2} - C(\bar{u}_{p1}, \bar{u}_{q1}) \right| \quad (9)$$

This alternative distance (9) can be thought of as the relative change in similarity that occurs during concatenation. This metric is designed to exhibit the property $d(S_1, S_2) \geq 0$, where $d(S_1, S_2) = 0$ if and only if $S_1 = S_2$. In other words, the metric is guaranteed to be zero anywhere there is no artificial concatenation, and strictly positive at an artificial concatenation point. This ensures that contiguously spoken pitch periods always resemble each other more than the two pitch periods spanning a concatenation point.

Referring again to FIG. 8, at block 804, once discontinuities between segments are determined, the discontinuity information (i.e. distances) is added to the voice table in association with each segment. In one embodiment, the distances are stored as fields associated with each segment in the voice table. For example, the distance between $S_1$ and $S_2$ is stored in association with the segment $S_1$.

Figure 9:
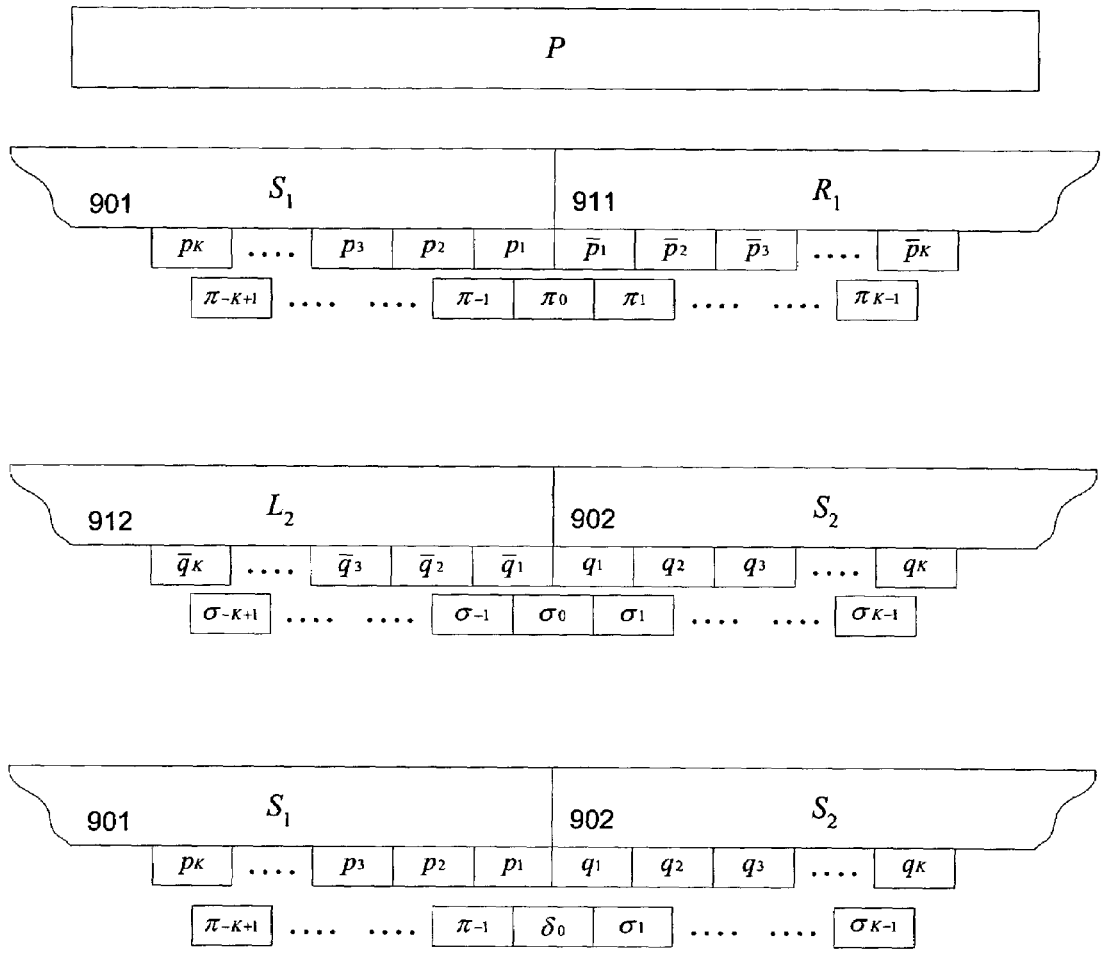
FIG. 9 illustrates an example of centered pitch periods.

As discussed above, in an alternate embodiment of the present invention, centered pitch periods may be considered. Centered pitch periods include the right half of a first pitch period, and the left half of an adjacent second pitch period. Referring to FIG. 9, let $p_K \ldots p_1$ denote the last K pitch periods of $S_1$ 901, and $\bar{p}_1 \ldots \bar{p}_K$ denote the first K pitch periods of $R_1$ 911, so that the boundary between $S_1$ 901 and $R_1$ 911 falls in the middle of the span $p_K \ldots p_1 \bar{p}_1 \ldots \bar{p}_K$. To derive centered pitch periods, the samples are shuffled to consider instead the span $\pi_{-K+1} \ldots \pi_0 \ldots \pi_{K-1}$, where the centered pitch period $\pi_0$ comprises the right half of $p_1$ and the left half of $\bar{p}_1$, a centered pitch period $\pi_{-k}$ comprises the right half of $p_{k+1}$ and the left half of $p_k$, and a centered pitch period $\pi_k$ comprises the right half of $\bar{p}_k$ and the left half of $\bar{p}_{k+1}$, for 1≦k≦K−1. This results in 2K−1 centered pitch periods instead of 2K pitch periods, with the boundary between $S_1$ 901 and $R_1$ 911 falling exactly in the middle of $\pi_0$. Similarly, the boundary between $L_2$ 912 and $S_2$ 902 falls in the middle of the span $\bar{q}_K \ldots \bar{q}_1 q_1 \ldots q_K$, corresponding to the span of centered pitch periods $\sigma_{-K+1} \ldots \sigma_0 \ldots \sigma_{K-1}$, as illustrated in FIG. 9.

An advantage of the centered representation of centered pitch periods is that the boundary may be precisely characterized by one vector in the global vector space, instead of inferred a posteriori from the position of the two vectors on either side, as illustrated in FIG. 5. In one embodiment, K−1 centered pitch periods for each of the M segments are gathered into a matrix W, in a similar manner as described above with respect to FIG. 6. In one embodiment, the centered pitch periods are zero padded symmetrically, meaning that zeros are added to the left and right side of the samples. The resulting vector space is computed by performing a Singular Value Decomposition (SVD) of the matrix, W, in a similar manner to that described above with respect to FIGS. 6 and 7. This results in (2(K−1)+1)M feature vectors in the global vector space.

When considering centered pitch periods, the discontinuity for a concatenation may be computed in terms of trajectory difference rather than location difference. To illustrate, consider the two sets of centered pitch periods $\pi_{-K+1} \ldots \pi_0 \ldots \pi_{K-1}$ and $\sigma_{-K+1} \ldots \sigma_0 \ldots \sigma_{K-1}$, defined as above for the two segments $S_1$-$R_1$ and $L_2$-$S_2$. After performing the SVD as described above, the result is a global vector space comprising the vectors $u_{\pi_k}$ and $u_{\sigma_k}$, representing the centered pitch periods $\pi_k$ and $\sigma_k$, respectively, for (−K+1≦k≦K−1). Consider the potential concatenation $S_1$-$S_2$ of these two segments, obtained as $\pi_{-K+1} \ldots \pi_{-1} \delta_0 \sigma_1 \ldots \sigma_{K-1}$, where $\delta_0$ represents the concatenated centered pitch period (i.e., consisting of the left half of $\pi_0$ and the right half of $\sigma_0$). This sequence has a corresponding representation in the global vector space given by:

$$u_{\pi_{-K+1}} \ldots u_{\pi_{-1}} u\delta_0 u_{\sigma_1} \ldots u_{\sigma_{K-1}} \qquad (10)$$

In one embodiment, the discontinuity associated with this concatenation is expressed as the cumulative difference in closeness before and after the concatenation:

$$d(S_1,S_2)=C(u_{\pi_{-1}},u\delta_0)+C(u\delta_0,u_{\sigma_1})-C(u_{\pi_{-1}},u_{\pi_0})-C(u_{\sigma_0},u_{\sigma_1}), \qquad (11)$$

where the closeness function C assumes the same functional form as in (7). This metric exhibits the property $d(S_1,S_2) \geq 0$, where $d(S_1,S_2)=0$ if and only if $S_1=S_2$. In other words, the metric is guaranteed to be zero anywhere there is no artificial concatenation, and strictly positive at an artificial concatenation point. This ensures that contiguously spoken pitch periods always resemble each other more than the two pitch periods spanning a concatenation point.

Proof of concept testing has been performed on an embodiment of the present invention. Preliminary experiments were conducted on data recorded to build the voice table used in MacinTalk™ for MacOS® X version 10.3, available from Apple Computer, Inc., the assignee of the present invention. The focus of these experiments was the phoneme P=AA. Specifically, all M=282 instances of speech segments (in this case, diphones) with a left or right boundary falling in the middle of the phoneme AA were extracted from the voice table. For each instance, K=3 pitch periods on the left and K=3 pitch periods on the right of the boundary were extracted. The maximum number of samples observed in these pitch periods was N=125. This led to a (1692×125) input matrix comprising time-domain samples relevant to the boundary region of AA. The SVD of this matrix was computed and the associated feature vectors were obtained as described above.

To assess the correlation between the metric (8) and perceived discontinuity, an evaluation was designed to calculate how accurately the metric (8) could predict contiguity between segments. In other words, given a segment left of the boundary (e.g. $S_1$), what is the probability that (8) correctly identifies (from the acoustics only) the segment right of the boundary (e.g. $R_1$) which is marked as contiguous in the voice table. This is a rather severe test, since in practice, only "near-contiguity" needs to be predicted (i.e. segments exhibiting a low perceived discontinuity). However, the ability to predict near-contiguity is undoubtedly related to the ability to predict contiguity, and the latter test has the merit to be objective, as well as simple to implement.

To establish a baseline performance, a standard spectral metric, the Euclidean difference between vectors of mel-frequency cepstral coefficients (MFCC), was also evaluated. To conform to the state-of-the-art, 39-dimensional MFCC vectors were extracted, including the typical dynamic (delta and delta-delta) features. On the data considered, this baseline metric correctly predicted contiguity in 14.8% of the cases. This result underscores the basic inadequacy of spectral-only measures in relation to quantifying a discontinuity. In contrast, the metric (8) correctly predicted contiguity in 92.6% of the cases. By construction, (9) achieved perfect contiguity prediction. This evaluation confirms the viability of the present invention for assessing the amount of discontinuity between speech segments in concatenative text-to-speech synthesis.

Figure 10A:
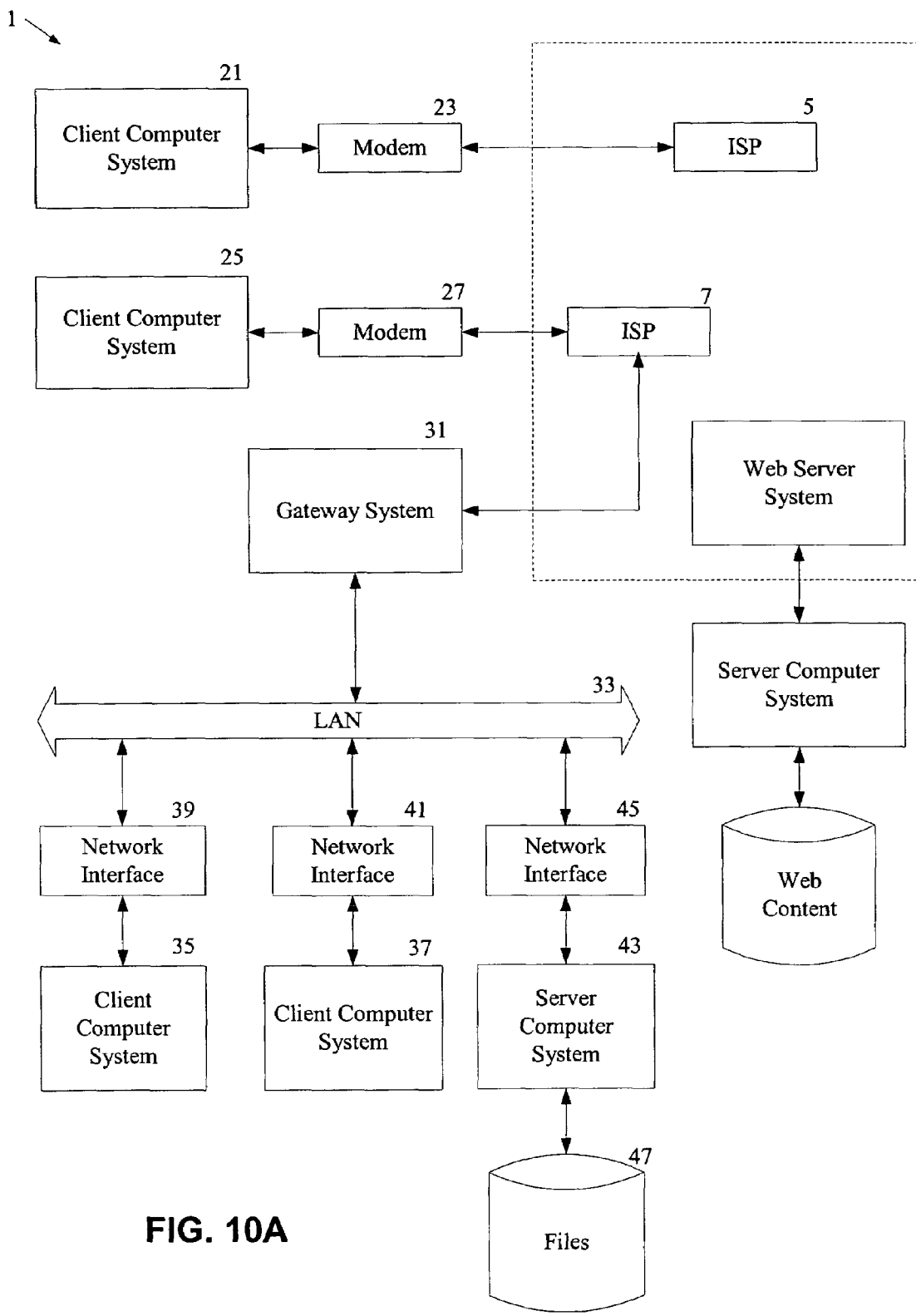
FIG. 10A is a diagram of one embodiment of an operating environment suitable for practicing the present invention.
Figure 10B:
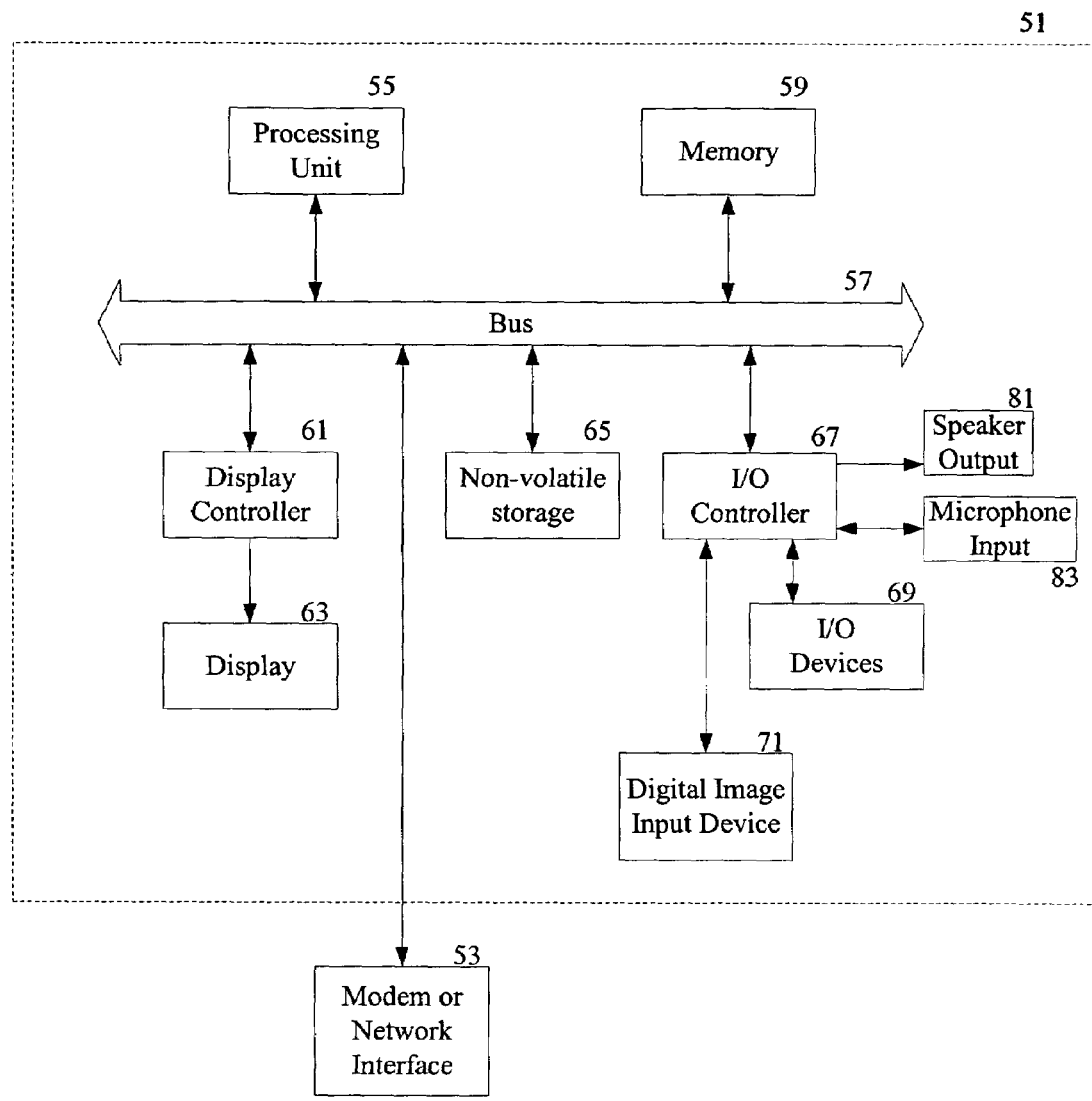
FIG. 10B is a diagram of one embodiment of a computer system suitable for use in the operating environment of FIG. 10A.

The following description of FIGS. 10A and 10B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics/appliances, network PCs, minicomputers, mainframe computers, and the like. The invention can also be practiced in distributed computing environments where tasks are performed by remote processing devices that are linked through a communications network.

FIG. 10A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 10A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, consumer electronics/appliance, a network computer, a Web TV system, a handheld device, or other such computer system. Similarly, the ISP 7 provides Internet connectivity for client systems 25, 35, and 37, although as shown in FIG. 10A, the connections are not the same for these three computer systems. Client computer system 25 is coupled through a modem interface 27 while client computer systems 35 and 37 are part of a LAN. While FIG. 10A shows the interfaces 23 and 27 as generically as a "modem," it will be appreciated that each of these interfaces can be an analog modem, ISDN modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 10B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well-known technology. A speaker output 81 (for driving a speaker) is coupled to the I/O controller 67, and a microphone input 83 (for recording audio inputs, such as the speech input 106) is also coupled to the I/O controller 67. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 10B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Mac® OS from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A machine-implemented method comprising:
   i. extracting, via a microprocessor, portions from speech segments, the portions surrounding a segment boundary within a phoneme;
   ii. identifying time samples from the portions;
   iii. constructing a matrix W containing first data corresponding to the time samples from the portions surrounding the segment boundary within the phoneme and second data corresponding to the portions;
   iv. deriving feature vectors that represent the portions in a vector space by decomposing the matrix W containing the first data corresponding to the time samples from the portions surrounding the segment boundary within the phoneme and the second data corresponding to the portions; and
   v. determining a distance between the feature vectors in the vector space.

2. The machine-implemented method of claim 1, wherein decomposing the matrix W comprises extracting global boundary-centric features from the portions.

3. The machine-implemented method of claim 1, wherein the speech segments each include the segment boundary within the phoneme.

4. The machine-implemented method of claim 3, wherein the speech segments each include at least one diphone.

5. The machine-implemented method of claim 4, wherein the portions include at least one pitch period.

6. The machine-implemented method of claim 5, wherein decomposing the matrix W comprises performing a pitch synchronous singular value analysis on the pitch periods of the time-domain segments.

7. The machine-implemented method of claim 5, wherein the matrix W is a 2KM×N matrix represented by $$W = U\Sigma V^T$$

where K is the number of pitch periods near the segment boundary extracted from each segment, N is the maximum number of samples among the pitch periods, M is the number of segments in a voice table having a segment boundary within the phoneme, U is the 2KM×R left singular matrix with row vectors $u_i$ ($1 \leq i \leq 2KM$), $\Sigma$ is the R×R diagonal matrix of singular values $s_1 \geq s_2 \geq \ldots \geq s_R > 0$, V is the N×R right singular matrix with row vectors $v_j$ ($1 \leq j \leq N$), R<<2KM, and T denotes matrix transposition, wherein decomposing the matrix W comprises performing a singular value decomposition of W.

8. The machine-implemented method of claim 7, wherein the pitch periods are zero padded to N samples.

9. The machine-implemented method of claim 8, wherein a feature vector $\bar{u}_i$ is calculated as $$\bar{u}_i = u_i \Sigma$$

where $u_i$ is a row vector associated with a pitch period i, and $\Sigma$ is the singular diagonal matrix.

10. The machine-implemented method of claim 9, wherein the distance between two feature vectors is determined by a metric comprising the cosine of the angle between the two feature vectors.

11. The machine-implemented method of claim 10, wherein the metric comprises a closeness measure, C, between two feature vectors, $\bar{u}_k$ and $\bar{u}_l$, wherein C is calculated as $$C(\bar{u}_k, \bar{u}_l) = \cos(u_k \Sigma, u_l \Sigma) = \frac{u_k \Sigma^2 u_l^T}{\|u_k \Sigma\| \|u_l \Sigma\|}$$

for any $1 \leq k, l \leq 2KM$.

12. The machine-implemented method of claim 11, wherein a difference $d(S_1, S_2)$ between two segments in the voice table, $S_1$ and $S_2$, is calculated as $$d(S_1, S_2) = d_0(p_1, q_1) = 1 - C(\bar{u}_{p1}, \bar{u}_{q1})$$

where $d_0$ is the distance between pitch periods $p_1$ and $q_1$, $p_1$ is the last pitch period of $S_1$, $q_1$ is the first pitch period of $S_2$, $\bar{u}_{p1}$ is a feature vector associated with pitch period $p_1$, and $\bar{u}_{q1}$ is a feature vector associated with pitch period $q_1$.

13. The machine-implemented method of claim 12, wherein the calculation for the difference between two segments in the voice table, $S_1$ and $S_2$, is expanded to include a plurality of pitch periods from each segment.

14. The machine-implemented method of claim 12, wherein the difference between two segments in the voice table, $S_1$ and $S_2$, is associated with a discontinuity between $S_1$ and $S_2$.

15. The machine-implemented method of claim 11, wherein a difference $d(S_1, S_2)$ between two segments in the voice table, $S_1$ and $S_2$, is calculated as $$d(S_1, S_2) = \left| d_0(p_1, q_1) \frac{-d_0(p_1, \bar{p}_1) + d_0(q_1, \bar{q}_1)}{2} \right| = \left| \frac{C(\bar{u}_{p1}, \bar{u}_{\bar{p}1}) + C(\bar{u}_{q1}, \bar{u}_{\bar{q}1})}{2} - C(\bar{u}_{p1}, \bar{u}_{q1}) \right|$$

where $d_0$ is the distance between pitch periods, $p_1$ is the last pitch period of $S_1$, $\bar{p}_1$ is the first pitch period of a segment contiguous to $S_1$, $q_1$ is the first pitch period of $S_2$, $\bar{q}_1$ is the last pitch period of a segment contiguous to $S_2$, $\bar{u}_{p1}$ is a feature vector associated with pitch period $p_1$, $\bar{u}_{q1}$ is a feature vector associated with pitch period $q_1$, $\bar{u}_{\bar{p}1}$ is a feature vector associated with pitch period $\bar{p}_1$, and $\bar{u}_{\bar{q}1}$ is a feature vector associated with pitch period $\bar{q}_1$.

16. The machine-implemented method of claim 1, further comprising associating the distance between the feature vectors with speech segments in a voice table.

17. The machine-implemented method of claim 16, further comprising:
    selecting speech segments from the voice table based on the distance between the feature vectors.

18. The machine-implemented method of claim 4, wherein the portions include centered pitch periods.

19. The machine-implemented method of claim 18, wherein the matrix W is a (2(K−1)+1)M×N matrix represented by $$W = U\Sigma V^T$$

where K−1 is the number of centered pitch periods near the segment boundary extracted from each segment, N is the maximum number of samples among the centered pitch periods, M is the number of segments in a voice table having a segment boundary within the phoneme, U is the (2(K−1)+1)M×R left singular matrix with row vectors $u_i$ ($1 \leq i \leq (2(K-1)+1)M$), $\Sigma$ is the R×R diagonal matrix of singular values $s_1 \geq s_2 \geq \ldots \geq s_R > 0$, V is the N×R right singular matrix with row vectors $v_j$ ($1 \leq j \leq N$), R<<(2(K−1)+1)M), and $^T$ denotes matrix transposition, wherein decomposing the matrix W comprises performing a singular value decomposition of W.

20. The machine-implemented method of claim 19, wherein the centered pitch periods are symmetrically zero padded to N samples.

21. The machine-implemented method of claim 20, wherein a feature vector $\bar{u}_i$ is calculated as $$\bar{u}_i = u_i \Sigma$$

where $u_i$ is a row vector associated with a centered pitch period i, and $\Sigma$ is the singular diagonal matrix.

22. The machine-implemented method of claim 21, wherein the distance between two feature vectors is determined by a metric comprising a closeness measure, C, between two feature vectors, $\bar{u}_k$ and $\bar{u}_l$, wherein C is calculated as $$C(\bar{u}_k, \bar{u}_l) = \cos(u_k \Sigma, u_l \Sigma) = \frac{u_k \Sigma^2 u_l^T}{\|u_k \Sigma\| \|u_l \Sigma\|}$$

for any $1 \leq k, l \leq (2(K-1)+1)M$.

23. The machine-implemented method of claim 22, wherein a difference $d(S_1, S_2)$ between two segments in the voice table, $S_1$ and $S_2$, is calculated as $$d(S_1, S_2) = C(u_{\pi_{-1}}, u\delta_0) + C(u\delta_0, u_{\sigma_1}) - C(u_{\pi_{-1}}, u_{\pi_0}) - C(u_{\sigma_0}, u_{\sigma_1})$$

where $u_{\pi_{-1}}$ is a feature vector associated with a centered pitch period $\pi_{-1}$, $u\delta_0$ is a feature vector associated with a centered pitch period $\delta_0$, $u_{\sigma_1}$ is a feature vector associated with a centered pitch period $\sigma_1$, $u_{\pi_0}$ is a feature vector associated with a centered pitch period $\pi_0$, and $u_{\sigma_0}$ is a feature vector associated with a centered pitch period $\sigma_0$.

24. A machine-readable medium storing instructions to cause a machine to perform a machine-implemented method comprising:
   i. extracting portions from speech segments that surround a segment boundary within a phoneme;
   ii. identifying time samples from the portions;
   iii. constructing a matrix W containing first data corresponding to the time samples from the portions surrounding the segment boundary within the phoneme and second data corresponding to the portions;
   iv. deriving feature vectors that represent the portions in a vector space by decomposing the matrix W containing the first data corresponding to the time samples from the portions surrounding the segment boundary within the phoneme and the second data corresponding to the portions; and
   v. determining a distance between the feature vectors in the vector space.

25. The machine-readable medium of claim 24, wherein decomposing the matrix W comprises extracting global boundary-centric features from the portions.

26. The machine-readable medium of claim 24, wherein the speech segments each include the segment boundary within the phoneme.

27. The machine-readable medium of claim 26, wherein the speech segments each include at least one diphone.

28. The machine-readable medium of claim 27, wherein the portions include at least one pitch period.

29. The machine-readable medium of claim 28, wherein decomposing the matrix W comprises performing a pitch synchronous singular value analysis on the pitch periods of the time-domain segments.

30. The machine-readable medium of claim 28, wherein the matrix W is a 2KM×N matrix represented by $$W = U \Sigma V^T$$

where K is the number of pitch periods near the segment boundary extracted from each segment, N is the maximum number of samples among the pitch periods, M is the number of segments in a voice table having a segment boundary within the phoneme, U is the 2KM×R left singular matrix with row vectors $u_i$ ($1 \leq i \leq 2KM$), is the R×R diagonal matrix of singular values $s_1 \geq s_2 \geq \ldots \geq s_R > 0$, V is the N×R right singular matrix with row vectors $v_j$ ($1 \leq j \leq N$), R<<2KM, and $^T$ denotes matrix transposition, wherein decomposing the matrix W comprises performing a singular value decomposition of W.

31. The machine-readable medium of claim 30, wherein the pitch periods are zero padded to N samples.

32. The machine-readable medium of claim 31, wherein a feature vector $\bar{u}_i$ is calculated as $$\bar{u}_i = u_i \Sigma$$

where $u_i$ is a row vector associated with a pitch period i, and $\Sigma$ is the singular diagonal matrix.

33. The machine-readable medium of claim 32, wherein the distance between two feature vectors is determined by a metric comprising the cosine of the angle between the two feature vectors.

34. The machine-readable medium of claim 33, wherein the metric comprises a closeness measure, C, between two feature vectors, $\bar{u}_k$ and $\bar{u}_l$, wherein C is calculated as $$C(\bar{u}_k, \bar{u}_l) = \cos(u_k \Sigma, u_l \Sigma) = \frac{u_k \Sigma^2 u_l^T}{\|u_k \Sigma\| \|u_l \Sigma\|}$$

for any $1 \leq k, l \leq 2KM$.

35. The machine-readable medium of claim 34, wherein a difference $d(S_1, S_2)$ between two segments in the voice table, $S_1$ and $S_2$, is calculated as $$d(S_1, S_2) = d_0(p_1, q_1) = 1 - C(\bar{u}_{p1}, \bar{u}_{q1})$$

where $d_0$ is the distance between pitch periods $p_1$ and $q_1$, $p_1$ is the last pitch period of $S_1$, $q_1$ is the first pitch period of $S_2$, $\bar{u}_{p1}$ is a feature vector associated with pitch period $p_1$, and $\bar{u}_{q1}$ is a feature vector associated with pitch period $q_1$.

36. The machine-readable medium of claim 35, wherein the calculation for the difference between two segments in the voice table, $S_1$ and $S_2$, is expanded to include a plurality of pitch periods from each segment.

37. The machine-readable medium of claim 35, wherein the difference between two segments in the voice table, $S_1$ and $S_2$, is associated with a discontinuity between $S_1$ and $S_2$.

38. The machine-readable medium of claim 34, wherein a difference $d(S_1, S_2)$ between two segments in the voice table, $S_1$ and $S_2$, is calculated as $$d(S_1, S_2) = \left| d_0(p_1, q_1) \frac{-d_0(p_1, \bar{p}_1) + d_0(q_1, \bar{q}_1)}{2} \right| =$$

$$\left| \frac{C(\bar{u}_{p1}, \bar{u}_{\bar{p}1}) + C(\bar{u}_{q1}, \bar{u}_{\bar{q}1})}{2} - C(\bar{u}_{p1}, \bar{u}_{q1}) \right|$$

where $d_0$ is the distance between pitch periods, $p_1$ is the last pitch period of $S_1$, $\bar{p}_1$ is the first pitch period of a segment contiguous to $S_1$, $q_1$ is the first pitch period of $S_2$, $\bar{q}_1$ is the last pitch period of a segment contiguous to $S_2$, $\bar{u}_{p1}$ is a feature vector associated with pitch period $p_1$, $\bar{u}_{q1}$ is a feature vector associated with pitch period $q_1$, $\bar{u}_{\bar{p}1}$ is a feature vector associated with pitch period $\bar{p}_1$, and $\bar{u}_{\bar{q}1}$ is a feature vector associated with pitch period $\bar{q}_1$.

39. The machine-readable medium of claim 24, wherein the method further comprises associating the distance between the feature vectors with speech segments in a voice table.

40. The machine-readable medium of claim 39, wherein the method further comprises:
selecting speech segments from the voice table based on the distance between the feature vectors.

41. The machine-readable medium of claim 27, wherein the portions include centered pitch periods.

42. The machine-readable medium of claim 41, wherein the matrix W is a (2(K−1)+1)M×N matrix represented by $$W = U\Sigma V^T$$

where K−1 is the number of centered pitch periods near the segment boundary extracted from each segment, N is the maximum number of samples among the centered pitch periods, M is the number of segments in a voice table having a segment boundary within the phoneme, U is the (2(K−1)+1)M×R left singular matrix with row vectors $u_i$ ($1 \leq i \leq (2(K-1)+1)M$), $\Sigma$ is the R×R diagonal matrix of singular values $s_1 \geq s_2 \geq \ldots \geq s_R > 0$, V is the N×R right singular matrix with row vectors $v_j$ ($1 \leq j \leq N$), $R \ll (2(K-1)+1)M$, and T denotes matrix transposition, wherein decomposing the matrix W comprises performing a singular value decomposition of W.

43. The machine-readable medium of claim 42, wherein the centered pitch periods are symmetrically zero padded to N samples.

44. The machine-readable medium of claim 43, wherein a feature vector $\bar{u}_i$ is calculated as $$\bar{u}_i = u_i \Sigma$$

where $\bar{u}_i$ is a row vector associated with a centered pitch period i, and $\Sigma$ is the singular diagonal matrix.

45. The machine-readable medium of claim 44, wherein the distance between two feature vectors is determined by a metric comprising a closeness measure, C, between two feature vectors, $\bar{u}_k$ and $\bar{u}_l$, wherein C is calculated as $$C(\bar{u}_k, \bar{u}_l) = \cos(u_k\Sigma, u_l\Sigma) = \frac{u_k\Sigma^2 u_l^T}{\|u_k\Sigma\| \|u_l\Sigma\|}$$

for any $1 \leq k, l \leq (2(K-1)+1)M$.

46. The machine-readable medium of claim 45, wherein a difference $d(S_1,S_2)$ between two segments in the voice table, $S_1$ and $S_2$, is calculated as $$d(S_1,S_2) = C(u_{\pi_{-1}}, u\delta_0) + C(u\delta_0, u_{\sigma_1}) - C(u_{\pi_{-1}}, u_{\pi_0}) - C(u_{\sigma_0}, u_{\sigma_1})$$

where $u_{\pi_{-1}}$ is a feature vector associated with a centered pitch period $\pi_{-1}$, $u\delta_0$ is a feature vector associated with a centered pitch period $\delta_0$, $u_{\sigma_1}$ is a feature vector associated with a centered pitch period $\sigma_1$, $u_{\pi_0}$ is a feature vector associated with a centered pitch period $\pi_0$, and $u_{\sigma_0}$ is a feature vector associated with a centered pitch period $\sigma_0$.

47. An apparatus comprising:
means for extracting portions from speech segments, the portions surrounding a segment boundary within a phoneme;
means for identifying time samples from the portions;
means for constructing a matrix W containing first data corresponding to the time samples from the portions surrounding the segment boundary within the phoneme and second data corresponding to the portions; and
means for deriving feature vectors that represent the portions in a vector space by decomposing the matrix W containing the first data corresponding to the time samples from the portions surrounding the segment boundary within the phoneme and the second data corresponding to the portions; and
means for determining a distance between the feature vectors in the vector space.

48. The apparatus of claim 47, wherein the means for decomposing the matrix W comprises means for extracting global boundary-centric features from the portions.

49. The apparatus of claim 47, wherein the speech segments each include the segment boundary within the phoneme.

50. The apparatus of claim 49, wherein the speech segments each include at least one diphone.

51. The apparatus of claim 50, wherein the portions include at least one pitch period.

52. The apparatus of claim 51, wherein the means for decomposing the matrix W comprises means for performing a pitch synchronous singular value analysis on the pitch periods of the time-domain segments.

53. The apparatus of claim 51, wherein the matrix W is a 2KM×N matrix represented by $$W = U\Sigma V^T$$

where K is the number of pitch periods near the segment boundary extracted from each segment, N is the maximum number of samples among the pitch periods, M is the number of segments in a voice table having a segment boundary within the phoneme, U is the 2KM×R left singular matrix with row vectors $u_i$ ($1 \leq i \leq 2KM$), is the R×R diagonal matrix of singular values $s_1 \geq s_2 \geq \ldots \geq s_R > 0$, V is the N×R right singular matrix with row vectors $v_j$ ($1 \leq j \leq N$), $R \ll 2KM$, and T denotes matrix transposition, wherein decomposing the matrix W comprises performing a singular value decomposition of W.

54. The apparatus of claim 53, wherein the pitch periods are zero padded to N samples.

55. The apparatus of claim 54, wherein a feature vector $\bar{u}_i$ is calculated as $$\bar{u}_i = u_i \Sigma$$

where $u_i$ is a row vector associated with a pitch period i, and $\Sigma$ is the singular diagonal matrix.

56. The apparatus of claim 55, wherein the distance between two feature vectors is determined by a metric comprising the cosine of the angle between the two feature vectors.

57. The apparatus of claim 56, wherein the metric comprises a closeness measure, C, between two feature vectors, $\bar{u}_k$ and $\bar{u}_l$, wherein C is calculated as $$C(\overline{u}_k, \overline{u}_l) = \cos(u_k\Sigma, u_l\Sigma) = \frac{u_k\Sigma^2 u_l^T}{\|u_k\Sigma\|\|u_l\Sigma\|}$$

for any $1 \leq k, l \leq 2KM$.

58. The apparatus of claim 57, wherein a difference $d(S_1, S_2)$ between two segments in the voice table, $S_1$ and $S_2$, is calculated as $$d(S_1, S_2) = d_0(p_1, q_1) = 1 - C(\overline{u}_{p1}, \overline{u}_{q1})$$

where $d_0$ is the distance between pitch periods $p_1$ and $q_1$, $p_1$ is the last pitch period of $S_1$, $q_1$ is the first pitch period of $S_2$, $\overline{u}_{p1}$ is a feature vector associated with pitch period $p_1$, and $\overline{u}_{q1}$ is a feature vector associated with pitch period $q_1$.

59. The apparatus of claim 58, wherein the calculation for the difference between two segments in the voice table, $S_1$ and $S_2$, is expanded to include a plurality of pitch periods from each segment.

60. The apparatus of claim 58, wherein the difference between two segments in the voice table, $S_1$ and $S_2$, is associated with a discontinuity between $S_1$ and $S_2$.

61. The apparatus of claim 57, wherein a difference $d(S_1, S_2)$ between two segments in the voice table, $S_1$ and $S_2$, is calculated as $$d(S_1, S_2) = \left| d_0(p_1, q_1) \frac{-d_0(p_1, \overline{p}_1) + d_0(q_1, \overline{q}_1)}{2} \right| = \left| \frac{C(\overline{u}_{p1}, \overline{u}_{\overline{p}1}) + C(\overline{u}_{q1}, \overline{u}_{\overline{q}1})}{2} - C(\overline{u}_{p1}, \overline{u}_{q1}) \right|$$

where $d_0$ is the distance between pitch periods, $p_1$ is the last pitch period of $S_1$, $\overline{p}_1$ is the first pitch period of a segment contiguous to $S_1$, $q_1$ is the first pitch period of $S_2$, $\overline{q}_1$ is the last pitch period of a segment contiguous to $S_2$, $\overline{u}_{p1}$ is a feature vector associated with pitch period $p_1$, $\overline{u}_{q1}$ is a feature vector associated with pitch period $q_1$, $\overline{u}_{\overline{p}1}$ is a feature vector associated with pitch period $\overline{p}_1$, and $\overline{u}_{\overline{q}1}$ is a feature vector associated with pitch period $\overline{q}_1$.

62. The apparatus of claim 47, further comprising means for associating the distance between the feature vectors with speech segments in a voice table.

63. The apparatus of claim 62, further comprising:
means for selecting speech segments from the voice table based on the distance between the feature vectors.

64. The apparatus of claim 50, wherein the portions include centered pitch periods.

65. The apparatus of claim 64, wherein the matrix W is a $(2(K-1)+1)M \times N$ matrix represented by $$W = U\Sigma V^T$$

where $K-1$ is the number of centered pitch periods near the segment boundary extracted from each segment, N is the maximum number of samples among the centered pitch periods, M is the number of segments in a voice table having a segment boundary within the phoneme, U is the $(2(K-1)+1)M \times R$ left singular matrix with row vectors $u_i$ ($1 \leq i \leq (2(K-1)+1)M$), $\Sigma$ is the $R \times R$ diagonal matrix of singular values $s_1 \geq s_2 \geq \ldots \geq s_R > 0$, V is the $N \times R$ right singular matrix with row vectors $v_j$ ($1 \leq j \leq N$), $R \ll (2(K-1)+1)M$, and T denotes matrix transposition, wherein decomposing the matrix W comprises performing a singular value decomposition of W.

66. The apparatus of claim 65, wherein the centered pitch periods are symmetrically zero padded to N samples.

67. The apparatus of claim 66, wherein a feature vector i is calculated as $$\overline{u}_i = u_i \Sigma$$

where $u_i$ is a row vector associated with a centered pitch period i, and $\Sigma$ is the singular diagonal matrix.

68. The apparatus of claim 67, wherein the distance between two feature vectors is determined by a metric comprising a closeness measure, C, between two feature vectors, $\overline{u}_k$ and $\overline{u}_l$, wherein C is calculated as $$C(\overline{u}_k, \overline{u}_l) = \cos(u_k\Sigma, u_l\Sigma) = \frac{u_k\Sigma^2 u_l^T}{\|u_k\Sigma\|\|u_l\Sigma\|}$$

for any $1 \leq k, l \leq (2(K-1)+1)M$.

69. The apparatus of claim 68, wherein a difference $d(S_1, S_2)$ between two segments in the voice table, $S_1$ and $S_2$, is calculated as $$d(S_1, S_2) = C(u_{\pi_{-1}}, u\delta_0) + C(u\delta_0, u_{\sigma_1}) - C(u_{\pi_{-1}}, u_{\pi_0}) - C(u_{\sigma_0}, u_{\sigma_1})$$

where $u_{\pi_{-1}}$ is a feature vector associated with a centered pitch period $\pi_{-1}$, $u\delta_0$ is a feature vector associated with a centered pitch period $\delta_0$, $u_{\sigma_1}$ is a feature vector associated with a centered pitch period $\sigma_1$, $u_{\pi_0}$ is a feature vector associated with a centered pitch period $\pi_0$, and $u_{\sigma_0}$ is a feature vector associated with a centered pitch period $\sigma_0$.

70. A system comprising:
a processing unit coupled to a memory through a bus; and
wherein the processing unit is configured, for a process, to extract portions from speech segments, the portions surrounding a segment boundary within a phoneme, identify time samples from the portions; construct a matrix W containing first data corresponding to the time samples from the portions surrounding the segment boundary within the phoneme and second data corresponding to the portions, and derive feature vectors that represent the portions in a vector space by decomposing the matrix W containing the first data corresponding to the time samples from the portions surrounding the segment boundary within the phoneme and the second data corresponding to the portions, and determine a distance between the feature vectors in the vector space.

71. The system of claim 70, wherein the process further causes the processing unit, when decomposing the matrix W, to extract global boundary-centric features from the portions.

72. The system of claim 70, wherein the speech segments each include the segment boundary within the phoneme.

73. The system of claim 72, wherein the speech segments each include at least one diphone.

74. The system of claim 73, wherein the portions include at least one pitch period.

75. The system of claim 74, wherein the process further causes the processing unit, when decomposing the matrix W, to perform a pitch synchronous singular value analysis on the pitch periods of the time-domain segments.

76. The system of claim 74, wherein the matrix W is a $2KM \times N$ matrix represented by $$W = U\tau V^T$$

where K is the number of pitch periods near the segment boundary extracted from each segment, N is the maximum number of samples among the pitch periods, M is the number of segments in a voice table having a segment boundary within the phoneme, U is the $2KM \times R$ left singular matrix with row vectors $u_i$ ($1 \leq i \leq 2KM$), $\Sigma$ is the $R \times R$ diagonal matrix of singular values $s_1 \geq s_2 \geq \ldots \geq s_R > 0$, V is the N×R right singular matrix with row vectors $v_j$ ($1 \leq j \leq N$), R<<2KM, and T denotes matrix transposition, wherein decomposing the matrix W comprises performing a singular value decomposition of W.

77. The system of claim 76, wherein the pitch periods are zero padded to N samples.

78. The system of claim 77, wherein a feature vector $\bar{u}_i$ is calculated as $$\bar{u}_i = u_i \Sigma$$

where $u_i$ is a row vector associated with a pitch period i, and $\Sigma$ is the singular diagonal matrix.

79. The system of claim 78, wherein the distance between two feature vectors is determined by a metric comprising the cosine of the angle between the two feature vectors.

80. The system of claim 79, wherein the metric comprises a closeness measure, C, between two feature vectors, $\bar{u}_k$ and $\bar{u}_l$, wherein C is calculated as $$C(\bar{u}_k, \bar{u}_l) = \cos(u_k \Sigma, u_l \Sigma) = \frac{u_k \Sigma^2 u_l^T}{\|u_k \Sigma\| \|u_l \Sigma\|}$$

for any $1 \leq k, l \leq 2KM$.

81. The system of claim 80, wherein a difference $d(S_1, S_2)$ between two segments in the voice table, $S_1$ and $S_2$, is calculated as $$d(S_1, S_2) = d_0(p_1, q_1) = 1 - C(\bar{u}_{p1}, \bar{u}_{q1})$$

where $d_0$ is the distance between pitch periods $p_1$ and $q_1$, $p_1$ is the last pitch period of $S_1$, $q_1$ is the first pitch period of $S_2$, $\bar{u}_{p1}$ is a feature vector associated with pitch period $p_1$, and $\bar{u}_{q1}$ is a feature vector associated with pitch period $q_1$.

82. The system of claim 81, wherein the calculation for the difference between two segments in the voice table, $S_1$ and $S_2$, is expanded to include a plurality of pitch periods from each segment.

83. The system of claim 81, wherein the difference between two segments in the voice table, $S_1$ and $S_2$, is associated with a discontinuity between $S_1$ and $S_2$.

84. The system of claim 80, wherein a difference $d(S_1, S_2)$ between two segments in the voice table, $S_1$ and $S_2$, is calculated as $$d(S_1, S_2) = \left| d_0(p_1, q_1) - \frac{d_0(p_1, \bar{p}_1) + d_0(q_1, \bar{q}_1)}{2} \right| = \left| \frac{C(\bar{u}_{p1}, \bar{u}_{\bar{p}1}) + C(\bar{u}_{q1}, \bar{u}_{\bar{q}1})}{2} - C(\bar{u}_{p1}, \bar{u}_{q1}) \right|$$

where $d_0$ is the distance between pitch periods, $p_1$ is the last pitch period of $S_1$, $\bar{p}_1$ is the first pitch period of a segment contiguous to $S_1$, $q_1$ is the first pitch period of $S_2$, $\bar{q}_1$ is the last pitch period of a segment contiguous to $S_2$, $\bar{u}_{p1}$ is a feature vector associated with pitch period $p_1$, $\bar{u}_{q1}$ is a feature vector associated with pitch period $q_1$, $\bar{u}_{\bar{p}1}$ is a feature vector associated with pitch period $\bar{p}_1$, and $\bar{u}_{\bar{q}1}$ is a feature vector associated with pitch period $\bar{q}_1$.

85. The system of claim 70, wherein the process further causes the processing unit to associate the distance between the feature vectors with speech segments in a voice table.

86. The system of claim 85, wherein the process further causes the processing unit to select speech segments from the voice table based on the distance between the feature vectors.

87. The system of claim 73, wherein the portions include centered pitch periods.

88. The system of claim 87, wherein the matrix W is a $(2(K-1)+1)M \times N$ matrix represented by $$W = U\Sigma V^T$$

where K−1 is the number of centered pitch periods near the segment boundary extracted from each segment, N is the maximum number of samples among the centered pitch periods, M is the number of segments in a voice table having a segment boundary within the phoneme, U is the $(2(K-1)+1)M \times R$ left singular matrix with row vectors $u_i$ ($1 \leq i \leq (2(K-1)+1)M$), $\Sigma$ is the R×R diagonal matrix of singular values $s_1 \geq s_2 \geq \ldots \geq s_R > 0$, V is the N×R right singular matrix with row vectors $v_j$ ($1 \leq j \leq N$), $R << (2(K-1)+1)M$, and $^T$ denotes matrix transposition, wherein decomposing the matrix W comprises performing a singular value decomposition of W.

89. The system of claim 88, wherein the centered pitch periods are symmetrically zero padded to N samples.

90. The system of claim 89, wherein a feature vector $\bar{u}_i$ is calculated as $$\bar{u}_i = u_i \Sigma$$

where $u_i$ is a row vector associated with a centered pitch period i, and $\Sigma$ is the singular diagonal matrix.

91. The system of claim 90, wherein the distance between two feature vectors is determined by a metric comprising a closeness measure, C, between two feature vectors, $\bar{u}_k$ and $\bar{u}_l$, wherein C is calculated as $$C(\bar{u}_k, \bar{u}_l) = \cos(u_k \Sigma, u_l \Sigma) = \frac{u_k \Sigma^2 u_l^T}{\|u_k \Sigma\| \|u_l \Sigma\|}$$

for any $1 \leq k, l \leq (2(K-1)+1)M$.

92. The system of claim 91, wherein a difference $d(S_1, S_2)$ between two segments in the voice table, $S_1$ and $S_2$, is calculated as $$d(S_1, S_2) = C(u_{\pi_{-1}}, u\delta_0) + C(u\delta_0, u_{\sigma_1}) - C(u_{\pi_{-1}}, u_{\pi_0}) - C(u_{\sigma_0}, u_{\sigma_1})$$

where $u_{\pi_{-1}}$ is a feature vector associated with a centered pitch period $\pi_{-1}$, $u\delta_0$ is a feature vector associated with a centered pitch period $\delta_0$, $u_{\sigma_1}$ is a feature vector associated with a centered pitch period $\sigma_1$, $u_{\pi_0}$ is a feature vector associated with a centered pitch period $\pi_0$, and $u_{\sigma_0}$ is a feature vector associated with a centered pitch period $\sigma_0$.

93. A machine-implemented method comprising:
  i. gathering, via a microprocessor, time-domain samples from recorded speech segments, wherein the time-domain samples include time samples of pitch periods surrounding a segment boundary within a phoneme;
  ii. constructing a matrix containing first data corresponding to the time samples of the pitch periods surrounding the segment boundary within the phoneme and second data corresponding to the pitch periods and deriving feature vectors that represent the time samples in a vector space by decomposing the matrix containing the first data corresponding to the time samples of the pitch periods surrounding the segment boundary within the phoneme and the second data corresponding to the pitch periods; and
  iii. determining a discontinuity between the segments, the discontinuity based on a distance between the features.

94. The machine-implemented method of claim 93, wherein the features incorporate phase information of the pitch periods.

95. A machine-readable medium storing instructions to cause a machine to perform a machine-implemented method comprising:
  i. gathering time-domain samples from recorded speech segments, wherein the time-domain samples include time samples of pitch periods surrounding a segment boundary within a phoneme;
  ii. constructing a matrix containing first data corresponding to the time samples of the pitch periods surrounding the segment boundary within the phoneme and second data corresponding to the pitch periods and deriving feature vectors that represent the time samples in a vector space by decomposing the matrix containing the first data corresponding to the time samples of the pitch periods surrounding the segment boundary within the phoneme and the second data corresponding the pitch periods; and
  iii. determining a discontinuity between the segments, the discontinuity based on a distance between the features.

96. The machine-readable medium of claim 95, wherein the features incorporate phase information of the pitch periods.

97. An apparatus comprising:
  means for gathering time-domain samples from recorded speech segments, wherein the time-domain samples include time samples of pitch periods surrounding a segment boundary within a phoneme;
  means for constructing a matrix containing first data corresponding to the time samples of the pitch periods surrounding the segment boundary within the phoneme and second data corresponding to the pitch periods and deriving feature vectors that represent the time samples in a vector space by decomposing the matrix containing the first data corresponding to the time domain samples of the pitch periods surrounding the segment boundary within the phoneme and the second data corresponding to the pitch periods;
  means for determining a discontinuity between the segments, the discontinuity based on a distance between the features.

98. The apparatus of claim 97, wherein the features incorporate phase information of the pitch periods.

99. A system comprising:
  a processing unit coupled to a memory through a bus; and
  a process executed from the memory by the processing unit to cause the processing unit to gather time-domain samples from recorded speech segments, wherein the time-domain samples include time samples of pitch periods surrounding a segment boundary within a phoneme, constructing a matrix containing first data corresponding to the time-domain samples of the pitch periods surrounding the segment boundary within the phoneme and second data corresponding to the pitch periods and deriving feature vectors that represent the time samples in a vector space by decomposing the matrix containing the first data corresponding to the time domain samples of the pitch periods surrounding the segment boundary within the phoneme and the second data corresponding to the pitch periods; and determine a discontinuity between the segments, the discontinuity based on a distance between the features.

100. The system of claim 99, wherein the features incorporate phase information of the pitch periods.

* * * * *

UNITED STATES PATENT AND TRADEMARK OFFICE
CERTIFICATE OF CORRECTION

PATENT NO. : 7,643,990 B1 Page 1 of 1
APPLICATION NO. : 10/693227
DATED : January 5, 2010
INVENTOR(S) : Jerome R. Bellegarda It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1128 days.

In column 7, line 12, delete "T" and insert -- $^T$ --, therefor.

In column 13, line 53, in claim 7, delete "T" and insert -- $^T$ --, therefor.

In column 17, line 37, in claim 42, delete "T" and insert -- $^T$ --, therefor.

In column 18, line 49, in claim 53, delete "T" and insert -- $^T$ --, therefor.

In column 19, line 63, in claim 65, delete "T" and insert -- $^T$ --, therefor.

In column 20, line 1, in claim 67, delete "i" and insert -- $\bar{u}_i$ --, therefor.

In column 20, line 60, in claim 76, delete "$W=U tV^T$" and insert -- $W = U \Sigma V^T$ --, therefor.

In column 21, line 3, in claim 76, delete "T" and insert -- $^T$ --, therefor.

Signed and Sealed this

Fourteenth Day of September, 2010

David J. Kappos
*Director of the United States Patent and Trademark Office*